United States Patent

[11] 3,633,894

[72] Inventor Carl E. Sunnegren
Bethlehem, Pa.
[21] Appl. No. 2,014
[22] Filed Jan. 12, 1970
[45] Patented Jan. 11, 1972
[73] Assignee Bethlehem Steel Corporation

[54] METHOD OF MAKING CALCINED MINERALS WITH REDUCED SULFUR CONTENT
6 Claims, 3 Drawing Figs.

[52] U.S. Cl. .................................................. 263/53 R
[51] Int. Cl. .................................................. C04b 1/02
[50] Field of Search .......................................... 263/53, 53 A; 106/101

[56] References Cited
UNITED STATES PATENTS
| | | | |
|---|---|---|---|
| 2,945,688 | 7/1960 | Pajenkamp et al. .......... | 263/53 |
| 3,425,853 | 2/1969 | Rives ............................ | 263/53 |
| 3,499,636 | 3/1970 | Hall .............................. | 263/53 X |

Primary Examiner—John J. Camby
Attorney—Joseph J. O'Keefe

ABSTRACT: A method for reducing the sulfur impurity content of basic flux material such as calcium or magnesium oxides in which the kiln atmosphere is changed from oxidizing to reducing during the latter part of the calcining operation.

THE THERMOCHEMISTRY OF SULFUR DIOXIDE FIXATION BY CALCIUM CARBONATE AND CALCIUM OXIDE

EFFECT OF OXYGEN CONTENT OF KILN GASES ON SULFUR CONTENT OF LIME

INVENTOR
Carl E. Sunnergren

METHOD OF MAKING CALCINED MINERALS WITH REDUCED SULFUR CONTENT

BACKGROUND OF THE INVENTION

This invention is directed to a method of producing a calcined basic oxide in which the sulfur, present as an impurity, has been substantially reduced.

In basic iron and steel manufacture, lime (CaO), and/or dolomite (CaO and MgO) are used as fluxes for slagging, or removal, of impurities such as silica and sulfur. With the introduction of basic oxygen furnaces, the amount of flux needed per ton of steel has increased, and at the same time the requirements for the flux purity have become more stringent. Maximum tolerance for sulfur in flux is about 0.05 percent. The raw materials for basic flux are the naturally occurring carbonates of the two minerals, calcium and magnesium. The overall calcining (removal of $CO_2$) reaction is:

$$CaCO_3 \rightarrow CaO + CO_2$$

and $$MgCO_3 \rightarrow MgO + CO_2$$

Ideally, this reaction must be carried out at a sufficiently high temperature and time length to cause the dissociation of the carbonate to the oxide + carbon dioxide, but not high enough, nor long enough to produce lime of reduced activity, known as "hard-burned lime."

Sulfur may be present in the native stone in several forms, notably as the sulfite, sulfate or iron pyrite. Some may also be present as elemental sulfur.

Because of the difficulty of sulfur removal, only flux materials with naturally low sulfur content have been utilized in the prior art.

It is the object of this invention to produce a reactive basic oxide with a sulfur impurity content low enough to render it suitable for use in the steelmaking process.

SUMMARY OF THE INVENTION

I have discovered that the aforementioned object can be achieved by suppressing the oxygen present in the kiln atmosphere during the latter part of the calcining process. The calcining process being defined to include drying the stone if necessary as well as heating the carbonate to cause dissociation. When the atmosphere is changed to a reducing condition production of calcium sulfate and calcium sulfite from various sulfur compounds present is reduced. In addition the amount of the calcium sulfate and calcium sulfite present in the native ore is also reduced. Sulfur, present as the sulfate, sulfite, sulfide and elemental sulfur, are continually converted to gaseous sulfur compounds which are vented along with the carbon dioxide produced from the calcining step.

When sulfur is the impurity present it is capable of entering into the reaction in the form of $SO_2$ or $SO_3$ and, in the example of calcium, the following reactions may occur:

$$CaCO_3 + SO_2 \rightarrow CaSO_3 + CO_2$$
$$CaCO_3 + SO_2 + \tfrac{1}{2}O_2 \rightarrow CaSO_4 + CO_2$$
$$CaO + SO_2 \rightarrow CaSO_3$$
$$CaO + SO_2 + \tfrac{1}{2}O_2 \rightarrow CaSO_4$$

It is important to note that $SO_2$ is a gas, while the sulfites and sulfates are solids.

When sulfur-containing solid compounds such as the above are formed, it is difficult to remove the sulfur in normal calcining atmospheres by reversing the reaction except by heating the material to very high temperatures. This could result in the production of the undesirable "hard-burned" lime.

In a typical calcining process limestone, or dolomite, is charged onto, or into, the feed end of the kiln and the oxide is removed either intermittently or continuously from the other end. The reaction for calcium carbonate is:

$$CaCO_3 + \overset{\Delta}{\rightarrow} CaO + CO_2$$

Temperatures range usually from 1,600° to 2,500° F.

Kiln design varies, but in general most kilns fall into the class heading of vertical, rotary or fluid bed, with wide variation in types under these headings.

A popular kiln of recent vintage is the circular traveling hearth kiln which features a hearth of large diameter that can be operated at various speeds of 35 to 200 min./rev. Controllability of this kiln is unique since the hearth is divided into heating zones, and through instrumentation, precise temperatures can be maintained uniformly at these different zones. Heat is supplied by multiple burners. The stone charge is fed from a preheated chamber onto the hearth in an even bed while a continuous loop drag conveyor removes all lime at the discharge point as it completes a revolution. In the practice of my invention air or the gas supply to the burners which control the heat supplied to the latter half of the kiln or that portion of the kiln prior to discharge of lime from the calcining zone, are set to cause a reducing flame combustion. The atmosphere in that section of the hearth is therefore "oxygen starved." With the reduction of the oxygen present, the reactions:

$$CaCO_3 + SO_2 + \tfrac{1}{2}O_2 \rightarrow CaSO_4 + CO_2$$
$$CaO + SO_2 + \tfrac{1}{2}O_2 \rightarrow CaSO_4$$

are no longer as favored as they are in an oxidizing atmosphere.

DESCRIPTION OF THE PREFERRED EMBODIMENT

Figure 1:
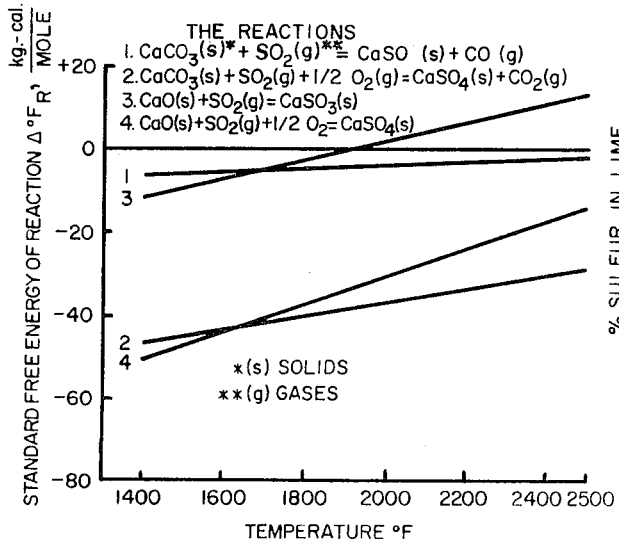
FIG. 1 is a graph of the free energy change $\Delta F°R'$ of the important sulfur reactions with calcium carbonate in the calcining process over a temperature range of 1,400° to 2,500° F.
Figure 2:
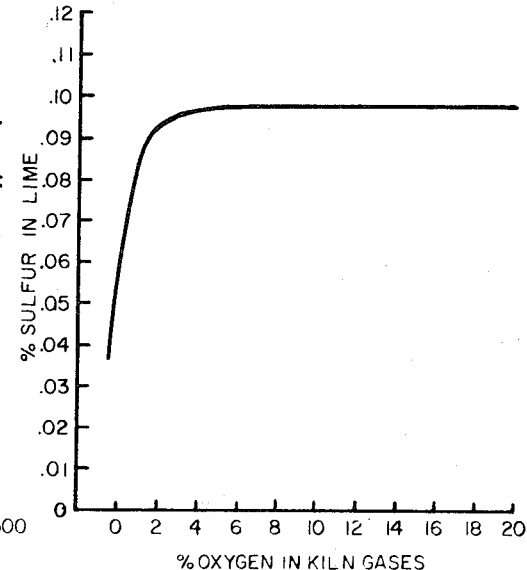
FIG. 2 shows an average of the percent sulfur content in lime when oxygen is suppressed in the kiln atmosphere.

Referring to FIG. 1, a negative value of the standard free energy change shows there is a tendency, or driving force, for a reaction to occur. The less negative the value, the less the tendency. Curves 2 and 4 differ from 1 and 3 in that when oxygen is present there is a tendency for calcium sulfate to form.

Figure 3:
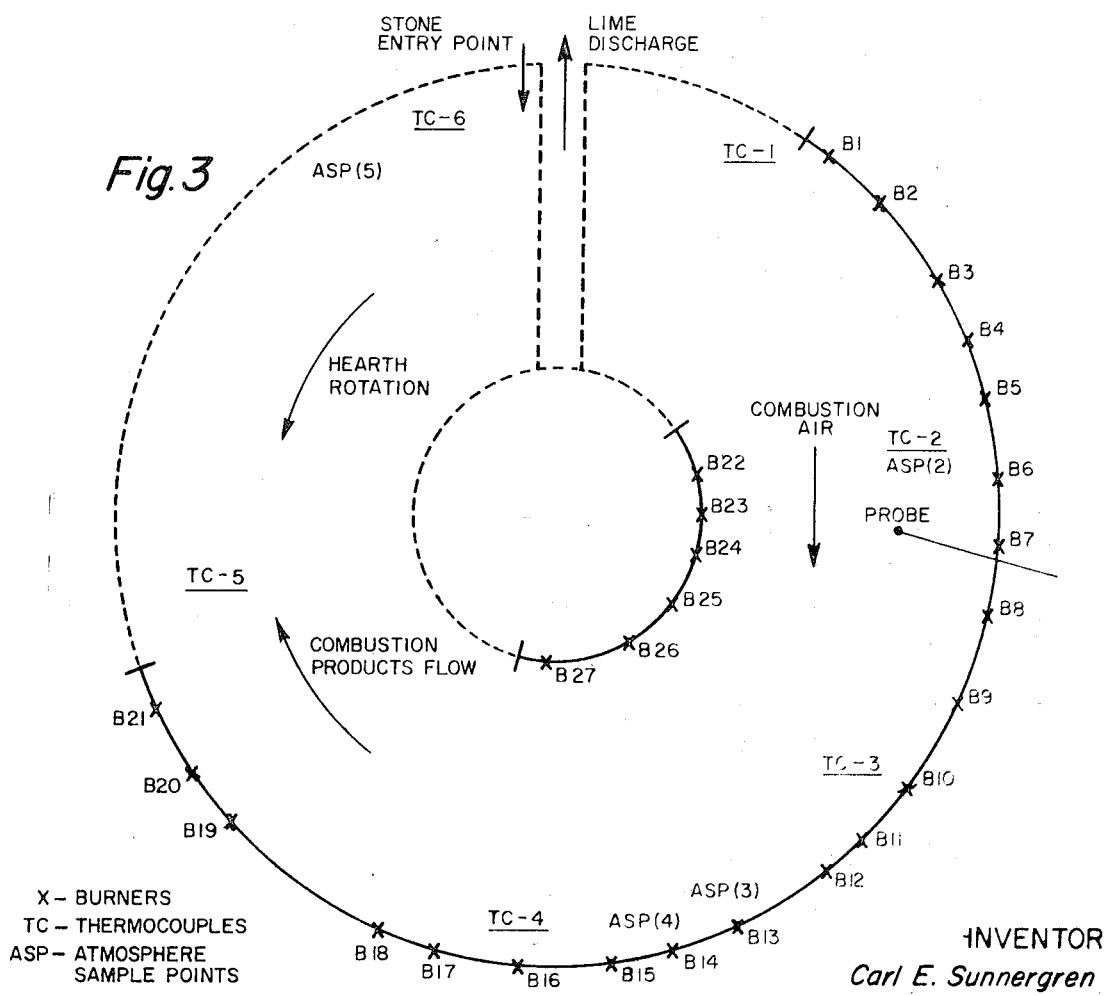
FIG. 3 is a schematic drawing of a circular traveling hearth with the burner positions B, thermocouple sample points TC, and atmosphere sample points ASP shown.

Referring to FIG. 3, burners 1 through 11 on the outside wall and burners 22 through 27 on the inside wall are set to burn with a reducing flame. Burners 12 through 21 function as standard oxidizing burners. The proper fuel/air ratio to the burners is maintained by atmosphere analysis. A typical example is as follows:

TABLE A.—KILN ATMOSPHERE ANALYSES AT VARIOUS POINT
[Sample Point (See FIGURE 3)] [1]

| Port #1, percent C | #6 burner, percent C | Probe, percent C | #12 burner, percent C | #15 burner, percent C | #19 burner, percent $O_2$ | Near flue, percent $O_2$ |
|---|---|---|---|---|---|---|
|  | 9.5 | 4.5 | 0.6 | 0.7 | 1.5 | 1.6 |
| 4.0 | 10.0 | 4.3 | 0.8 |  | 1.0 | 1.55 |
| 4.0 [2] | 9.75 | [2] 4.4 | [2] 0.7 | [2] 0.7 | [2] 1.75 | [2] 1.55 |

[1] C = combustibles.
[2] Average.

This sample analysis shows that the reducing flame burners, although covering only 35 percent of the active hearth are sufficient to generate a reducing atmosphere (one that contains an excess of combustible material or fuel) in at least 50 percent of the active hearth area. Analysis at burner 15, the approximate halfway point in the hearth shows combustibles present, while the atmosphere at burner 19 shows oxygen to be present.

Referring again to FIG. 3, the stone charge, which has been crushed and preheated using standard techniques well known in the prior art, enters the hearth area at place marked "stone entry point" and is conveyed through the kiln by the counterclockwise hearth rotation where it is fully discharged at the end of the revolution.

Below is the analysis of typical limestone runs:

TABLE B.—KILN TEMPERATURE PATTERN

| No. of lime samples | Sulfur in stone | Thermocouple readings, °F. | | | | | | Lime analysis, percent | | Percent sulfur removed |
|---|---|---|---|---|---|---|---|---|---|---|
| | | TC 1 | TC 2 | TC 3 | TC 4 | TC 5 | TC 6 | S | CO$_2$ | |
| 12 | 0.074 | 1,736 | 2,282 | 2,406 | 2,241 | 1,895 | 1,420 | 0.038 | 5.14 | 69.7 |
| 17 | 0.110 | 1,784 | 2,298 | 2,425 | 2,258 | 1,906 | 1,399 | 0.036 | 3.27 | 82.3 |
| 20 | 0.098 | 1,812 | 2,293 | 2,416 | 2,233 | 1,889 | 1,404 | 0.034 | 1.55 | 81.0 |
| 18 | 0.080 | 1,782 | 2,290 | 2,397 | 2,274 | 1,923 | 1,421 | 0.035 | 4.60 | 76.7 |
| 10 | 0.087 | 1,864 | 2,382 | 2,462 | 2,320 | 1,961 | 1,445 | 0.029 | 2.29 | 81.8 |
| Total | 77 | | | | | | | | | |
| Average | 0.090 | 1,795 | 2,309 | 2,421 | 2,265 | 1,914 | 1,417 | 0.036 | 3.28 | 78 |

Referring to the last line of table B, a total of 77 samples with an average of 0.090 percent sulfur in the stone were treated. The kiln temperatures range from about 1,400° F. at the entrance point, to a little above 2,400° F. at the midpoint of the kiln. The average time for a complete rotation is about 80 min. The lime in these samples contains an average of 0.036 percent sulfur after the treatment, which is an average of 78 percent of the sulfur removed.

The best temperature to use in the reducing zone is a variable within a range, and in general depends on the percent total sulfur to be removed. This means that not only must the sulfur present in the native stone be taken into consideration, but also the sulfur which may be present in the fuel as an impurity. The preferable temperature depends also on the final percent sulfur level to be achieved. In general, the greater the percent sulfur to be removed, or the lower the final percent sulfur level to be achieved, the higher should be either the operating temperature or the length of time the lime is exposed to the operating temperature. It should be noted that while it is not essential to keep the temperature uniformly high during the desulfurizing, it is preferable because of the reversibility of the reaction. The temperature relationship is shown in table C in which dolomite (53.2% CaCO$_3$+44.6% MgCO$_3$) is the sample.

TABLE C

| Temperature, °F. | % Sulfur Content (per weight of CaO+MgO) | |
|---|---|---|
| | Oxidizing | Reducing |
| 1500 | 0.05 | 0.029 |
| 1600 | 0.064 | 0.036 |
| 1700 | 0.057 | 0.017 |
| 1800 | 0.06 | 0.013 |
| 2000 | 0.042 | 0.013 |
| 2200 | 0.004 | 0.008 |

The above sample was run in a tube furnace with an average time of about 90 minutes and using a gas atmosphere approximating kiln conditions, but with no sulfur dioxide in the fuel gases. When a sample of limestone was similarly treated in a kiln, according to my invention, using natural gas as a fuel for the burners, the sulfur percent in the lime was 0.06 at about 1,600° F. and dropped to 0.025 when the temperature rose to about 1,800° F.

The effect of time and temperature on the percent sulfur present in the finished sample is illustrated below. The samples are limestone which were heated in a reducing atmosphere in a tube furnace.

It is obvious that there are many variations of this process which are within the scope of my invention. The time and the temperature may vary as well as the composition or particle size of the stone to be treated. Neither is it necessary for this process to be continuous with the calcining operation and it is not limited to any type of kiln or any hearth or refractory composition as long as the atmosphere is controllable. While I have used natural gas and coke oven gas as fuels, coke, coal, oil, their mixtures or other suitable fuels can be used.

I claim:

1. A method of treating at least one of the minerals of the group consisting of calcium carbonate, and magnesium carbonate and mixtures thereof, comprising the steps of:
   a. calcining said minerals, and
   b. desulfurizing said minerals by converting and maintaining nongaseous sulfur and sulfur-containing compounds as gaseous sulfur compounds in a heated furnace wherein the atmosphere in said furnace has an oxygen to fuel ratio less than the stoichiometric amount.

2. The method as claimed in claim 1 wherein the temperature in the furnace in step (b) is from about 1,700° to about 2,500° F. and the time is at least 5 minutes.

3. A method of treating at least one of the minerals of the group consisting of calcium carbonate and magnesium carbonate, and mixtures thereof, in a furnace comprising the steps of:
   a. passing said minerals through a first heated zone wherein the atmosphere in said first zone has an oxygen to fuel ratio greater than the stoichiometric ratio, wherein said minerals are calcined, and
   b. passing said minerals through a second heated zone wherein the atmosphere in said second zone has an oxygen to fuel ratio less than the stoichiometric ratio and wherein said minerals are desulfurized by converting and maintaining sulfur and sulfur-containing nongaseous compounds as gaseous sulfur compounds.

4. The method as claimed in claim 3 wherein the temperature in the furnace in step (b) is from about 1,700° to about 2,500° F. and the time is at least 5 minutes.

5. A method of treating at least one of the minerals of the group consisting of calcium carbonate and magnesium carbonate and mixtures thereof, comprising the steps of:
   a. calcining said minerals in a furnace,
   b. discharging said minerals from said furnace,
   c. charging said minerals in a furnace,
   d. converting and maintaining nongaseous sulfur and sulfur compounds as gaseous sulfur compounds by heating said

TABLE D

Sample No. 1, Initial sulfur of 0.08%

| | 1700° F. | | 1900° F. | |
|---|---|---|---|---|
| Time (minutes) | % S | % CO$_2$ | % S | % CO$_2$ |
| 10 | 0.090 | 20.9 | 0.048 | 0.15 |
| 30 | 0.093 | 0.20 | 0.022 | 0.06 |
| 60 | 0.081 | 0.21 | 0.005 | 0.15 |
| 90 | 0.048 | 0.26 | 0.006 | 0.24 |
| 120 | 0.039 | 0.21 | 0.005 | 0.23 |

Sample No. 2, Initial sulfur of 0.12

| 10 | 0.14 | 22.0 | 0.13 | 0.16 |
| 30 | 0.16 | 2.0 | 0.03 | 0.24 |
| 60 | 0.16 | 0.24 | 0.01 | 0.23 |
| 90 | 0.12 | 0.18 | 0.006 | 0.39 |
| 120 | 0.10 | 0.18 | 0.005 | 0.38 | minerals in said furnace in a heated atmosphere having an oxygen to fuel ratio of less than the stoichiometric ratio to desulfurize said minerals.

6. The method as claimed in claim 5 wherein the temperature in the furnace in step (b) is from about 1,700° to 2,500° F. and the time is at least 5 minutes.

\* \* \* \* \*